(12) United States Patent
Pritsker

(10) Patent No.: US 11,086,817 B2
(45) Date of Patent: Aug. 10, 2021

(54) SYSTOLIC SIMILARITY ESTIMATION WITH TWO-DIMENSIONAL SLIDING WINDOW

(71) Applicant: Intel Corporation, Santa Clara, CA (US)

(72) Inventor: Dan Pritsker, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 15/718,956

(22) Filed: Sep. 28, 2017

(65) Prior Publication Data

US 2019/0095384 A1    Mar. 28, 2019

(51) Int. Cl.
  *G06F 15/80*  (2006.01)
  *G06F 7/544*  (2006.01)
  *G06F 17/16*  (2006.01)

(52) U.S. Cl.
  CPC .......... *G06F 15/8046* (2013.01); *G06F 7/544* (2013.01); *G06F 7/5443* (2013.01); *G06F 17/16* (2013.01); *G06F 2207/5442* (2013.01)

(58) Field of Classification Search
  CPC ....... G06F 15/8046; G06F 7/544; G06F 17/16
  See application file for complete search history.

(56) References Cited

U.S. PATENT DOCUMENTS

| 5,490,094 | A  | * | 2/1996 | Heimburger | G06T 5/20 333/166 |
| 9,959,247 | B1 | * | 5/2018 | Woo | G06F 9/30032 |
| 10,521,488 | B1 | * | 12/2019 | Ross | G06F 17/16 |
| 2009/0225845 | A1 | * | 9/2009 | Veremeev | H04N 19/436 375/240.16 |

* cited by examiner

*Primary Examiner* — Michael D. Yaary
(74) *Attorney, Agent, or Firm* — Fletcher Yoder, P.C.

(57) ABSTRACT

A systolic array implemented in circuitry of an integrated circuit, includes a processing element array having processing elements arranged in a vertical direction and a horizontal direction, first loaders communicatively coupled to the processing element array to load samples $A_{m,n}$ from at least one external memory to the processing element array, and second loaders communicatively coupled to the processing element array to load samples $B_{k,l}$ from the at least one external memory to the processing element array. Each row of the samples $A_{m,n}$ is loaded one row at a time to a single processing element along the horizontal direction, and each row of the samples $B_{k,l}$ is loaded one row at a time to a single processing element along the vertical direction, wherein pairing between the samples $A_{m,n}$ and $B_{k,l}$ in the horizontal direction and the vertical direction enables data reuse to reduce bandwidth usage of the external memory.

20 Claims, 7 Drawing Sheets

SYSTOLIC SIMILARITY ESTIMATION WITH TWO-DIMENSIONAL SLIDING WINDOW

BACKGROUND

The present disclosure relates generally to processing of matrices of data, and more particularly to implementation of a systolic array structure to evaluate differences between matric datasets.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In many applications, such as object recognition, disparity mapping, localization, motion estimation, video compression, etc., it is useful to find similarity between two or more image datasets (e.g., image matrices). To quantify similarity between two image datasets, the sum of absolute differences (SAD) is often used. In particular, the SAD calculates the sum of absolute difference between each corresponding pixel pairs in two image dataset, and the least value indicates the highest similarity. Another usage of SAD is in registration and localization problems, when pair of images aren't spatially aligned. The image datasets are evaluated against each other based on the SAD while one image dataset is shifted with respect to the other image dataset by a pre-determined offset amount. The SAD algorithm may be implemented using small or sparse templates that can conveniently fit into internal memory and reused over the calculation process.

However, it may be challenging to implement the SAD algorithm in a high-performance platform, at least due to complexities in terms of computing and bandwidth requirement. For example, when the sizes of the datasets and/or search region are big (e.g., big sliding window), the number of computing operations may be enormous. In these situations, the algorithm may be executed in parallel on multiple processing elements, such that the platform may support a high computing requirement under the given throughput constraint. These multiple processing elements, however, may be costly or difficult to manage, since it may be suboptimal to use the same processing scheme for both sparse and dense matrices. And, indeed, processing both sparse and dense matrices is often the case in the applications mentioned above (e.g., object recognition, disparity maps, localization, motion estimation, video compression, etc.).

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
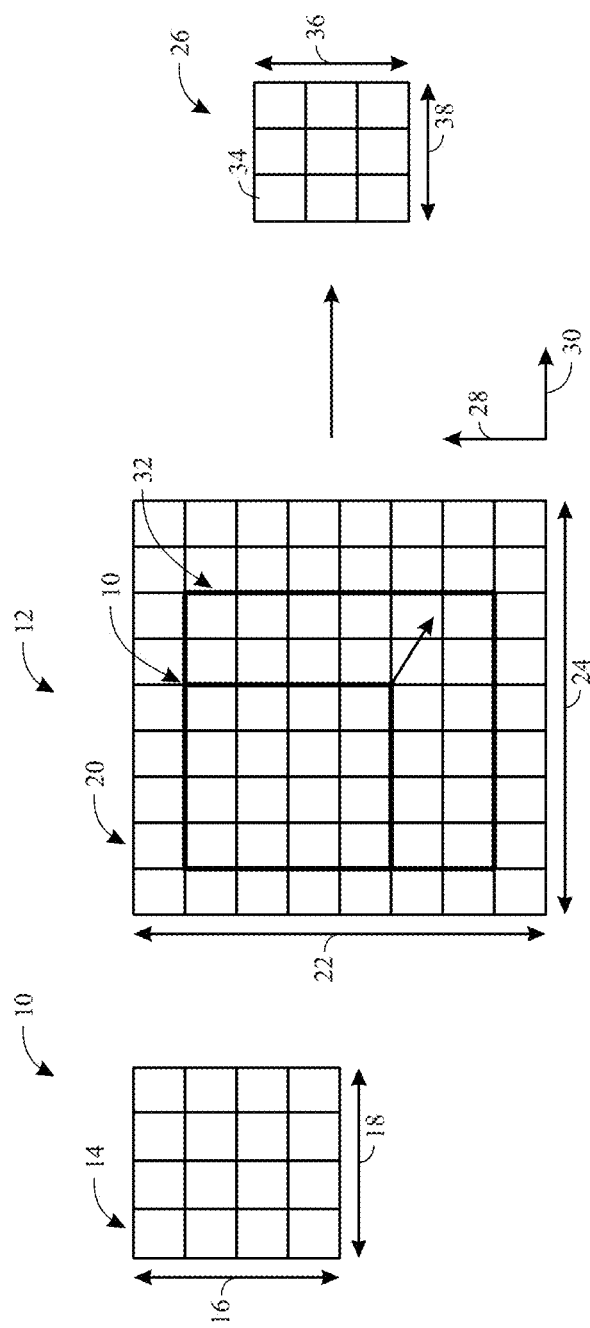
FIG. 1 is a schematic representation illustrating an iterative process to determine a SAD-based best match between two-dimensional (2D) datasets, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

In many applications, such as digital image processing, machine vision, object recognition, disparity maps, location, motion estimation, and video compression, the SAD is used to quantify similarity between two image datasets. For example, the SAD calculates the sum of absolute difference between each corresponding pixel pairs in two image datasets, and the least value indicates the highest similarity. Beyond comparison performed on static image datasets, the SAD may also be used in motion estimation to find a best location match of a template (e.g., template dataset) over another existing dataset (e.g., search dataset). This is done by iteratively calculating the SAD metrics between the template dataset and the existing dataset while repeatedly shifting the template dataset in two-dimensions (2D).

When the sum of absolute differences (SAD) is calculated in parallel, as may be done for relatively large datasets, since each operation may be relatively simple (e.g., subtract and accumulate functions), a field-programmable gate array (FPGA) may potentially be an attractive platform to implement the SAD algorithm. One of the challenges to implement SAD in FPGA, however, is to map the SAD to a parallel platform without stressing the platform's inherent limitations, such as routing congestion, high fan out busses, limited size on internal memory, or external memory bandwidth, latency, etc. Further, challenges may rise from sparsity of the datasets. In particular, at least due to deep pipelining of FPGAs, it may be challenging or complicated to design a data flow scheme to efficiently load sparse matrices. While sparse matrices may be processed as a subcase of dense matrices, it may be suboptimal to use the same processing scheme for both sparse and dense matrices. And, indeed, processing both sparse and dense matrices is often the case in the applications mentioned above (e.g., object recognition, disparity maps, localization, motion estimation, video compression, etc.).

Present embodiments relate to implementation of systolic arrays to evaluate differences between matric datasets while spatially distributing compute and reducing memory bandwidth requirement or usage. The systolic array may process a first and a second matrix datasets and generate a SAD output. The first and second matrix datasets may be reused in the x-dimension via a first data transfer scheme and in the y-dimension via a second data transfer scheme to create two-dimensional sliding window data reuse. As such the systolic array may more efficiently accelerate computation across a plurality of processing elements and enable efficient memory reuse. These implementations of systolic arrays may be carried out in programmable logic devices (e.g., FPGAs), application-specific integrated circuits (ASICs), or any other suitable device (e.g., a suitable processor running instructions to carry out the systolic array implementations of this disclosure).

FIG. 1 is a schematic representation illustrating such iterative process that uses SAD to find a best location match of a dataset 10 (e.g., a template dataset) over a dataset 12 (e.g., a search dataset). In the illustrated embodiment, the dataset 10 includes an array of data 14 (e.g., image blocks, pixels) having a height 16 (e.g., "height") and a width 18 (e.g., "width"). The dataset 12 includes an array of data 20 (e.g., image blocks, pixels) having a height 22 (e.g., window_height) and a width 24 (e.g., window_width). The size of the dataset 12 (e.g., height 22×width 24) may be greater than the size of the dataset 10 (e.g., height 16×width 18).

The SAD is performed over consecutive frames, and in each frame the dataset 10 is shifted to a different location in relation to the dataset 12 to produce a SAD output array 26. In particular, the dataset 10 shifts in a direction 28 (y-direction) and a direction 30 (x-direction) to search a search region 32 of the dataset 12. For each shift of the dataset 10, the SAD algorithm generates a SAD output number 34 corresponding to a SAD result of the particular search region 32. Accordingly, as the search region 32 expands in the directions 28 and 30, the SAD output array 26 is populated with the SAD output numbers 34 spanning a sliding window height 36 (e.g., "wind_height") and a sliding window width 38 (e.g., "wind_width"). The total shifts in the direction 28 corresponds to the sliding window height 36 and the total shifts in the direction 30 corresponds to the sliding window width 38. It should be noted that one or both of the dataset 10 and the dataset 12 may be sparse (e.g., a sparse matrix in which most the elements are zero) or dense (e.g., a dense matrix in which most of the elements are non-zero).

When the sizes of the datasets 10 and 12 are big (e.g., large sliding window), the number of computing operations can be enormous, and it may be challenging to implement the SAD algorithm in a high performance platform, at least due to complexities in terms of computing and bandwidth requirement or usage. FPGAs contain thousands of dedicated mathematical processing elements, such as independently controlled digital signal processing (DSP) blocks, which are on top of millions of more primitive logic elements. As such, FPGAs are highly applicable as a high throughput processing platform to implement the SAD algorithm. In an SAD implemented FPGA, it may be desirable to share the storage content between many processing elements. One way of achieving such storage sharing is to replicate the storage content; however, with a big dataset, such implementation may quickly reach the maximum size of the available internal memory. Another way to approach such storage sharing is to implement a systolic array structure to perform SAD on FPGA. This approach takes advantage of FPGAs (e.g., internal interconnect storage) and data is streamed through the device fabric. This approach may also reduce or substantially minimize the routing congestion as it defines the minimalistic interconnect structure between processing elements (PEs) of the systolic array.

Figure 2:
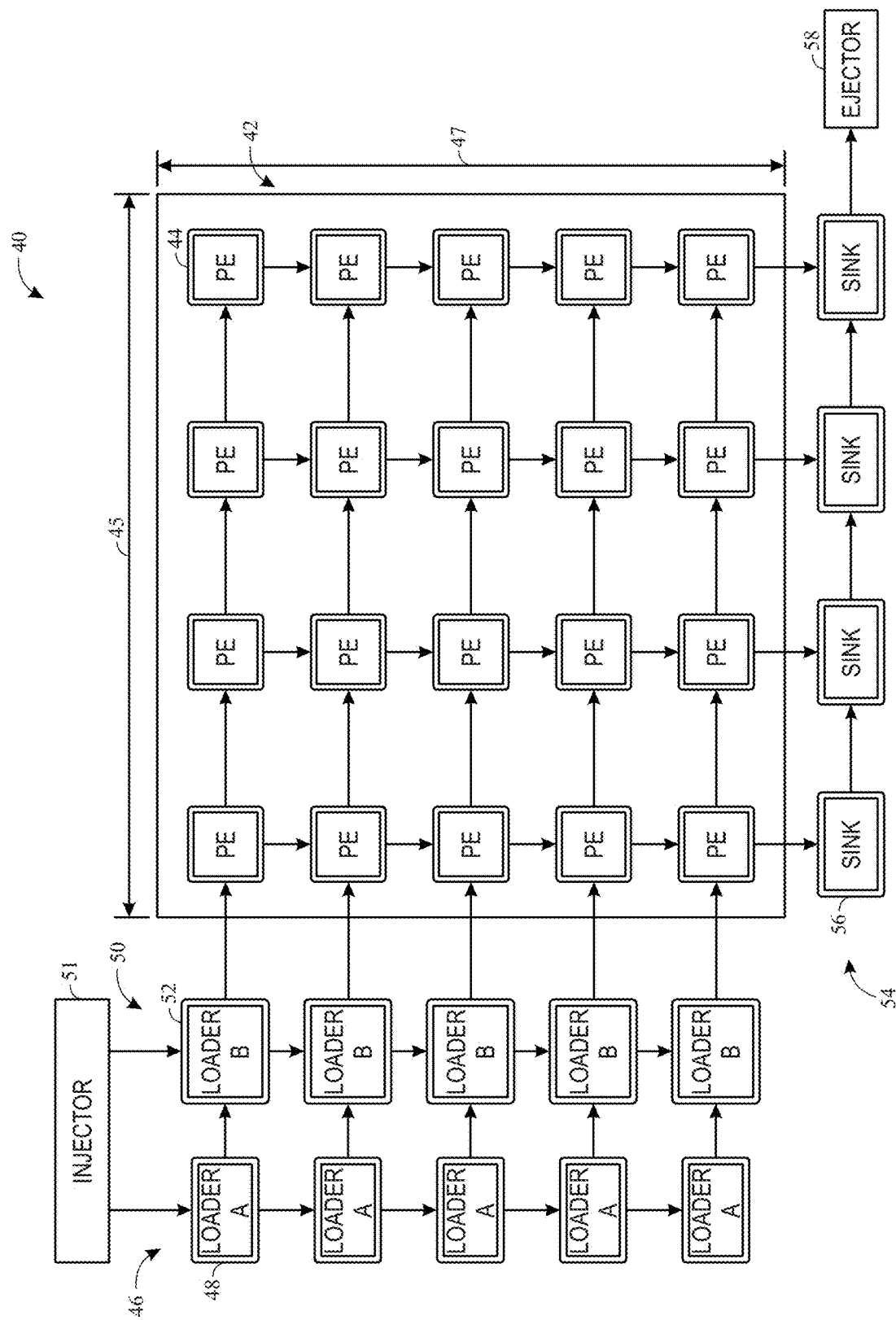
FIG. 2 is a block diagram illustrating an example architecture of a systolic array that is used to implement the SAD algorithm, in accordance with an embodiment.

Despite the great advantages of systolic arrays and their applicability in digital chip implementations, it may be far from trivial to design systolic arrays to perform SAD, in that specific array structures need to be designed to make data flow efficient and reusable across multiple PEs of the systolic array. With the foregoing in mind, FIG. 2 shows a block diagram illustrating an example architecture of a systolic array 40 that is used to implement the SAD algorithm on a FPGA. It should be noted that the architecture of the systolic array 40 discussed herein is not limited to the application of implementing the SAD algorithm on a FPGA, it may also be used to implement other suitable algorithms, such as sum of squared difference (SSD), and the algorithm (e.g., SAD, SSD, etc.) may be implemented on other suitable platform, such as application-specific integrated circuit (ASIC).

The architecture of the systolic array 40 discussed below may address several considerations/design challenges. First, in the case that the datasets 10 and 12 are significantly large, these datasets are stored in an external memory or memories communicatively coupled to the systolic array 40, instead of an internal memory or memories of the systolic array 40. In the present embodiments, data from the datasets 10 and 12 are reused to reduce external bandwidth. Second, to enable parallel processing and eventually achieve high throughput, the computation performed by the systolic array 40 is accelerated and deployed over a plurality of computational blocks. Third, one or both of the datasets may be sparse (e.g., the dataset 10 is sparse and the dataset 12 is dense), so specific treatment or routing of the data flow (e.g., to relive data flow congestions) is designed to enable efficient implementation of the systolic array 40 with high throughput. Defining the dataflow, the sequence of samples, and the content of PE, among others, are among important criteria to achieve efficient implementation of the SAD.

As illustrated in FIG. 2, the systolic array 40 includes a two-dimensional (2D) PE array 42 including a plurality of PEs 44 that span a width 45 and a height 47. In the illustrated embodiment, the width 45 and the height 47 of the systolic array 40 are four and five, respectively (e.g., a 5 row×4 column array of PEs 44). The PE array 42 is coupled to a loader array 46 including a plurality of loaders 48 (e.g., loader A) and coupled to a loader array 50 including a plurality of loaders 52 (e.g., loader B). Each of the PEs 44, the plurality of loaders 48 and loaders 52 includes a local memory. The loader arrays 46 and 50 are communicatively coupled to an injector 51. The injector 51 may load the dataset 10 (e.g., template dataset) and the dataset 12 (e.g., search dataset) from the external memory to the loader arrays 46 and 50, respectively. The loader arrays 46 and 50 then load the dataset 10 (e.g., template dataset) and the dataset 12 (e.g., search dataset), respectively, to the PE array 42, where the SAD algorithm is performed.

The loader arrays 46 and 50 may support the case that the dataset 10 is sparse and the dataset 12 is dense (e.g., with full density). In particular, each of the loaders 52 stores a full single row of the dense dataset 12. In contrast, since the dataset 10 is sparse, the loaders 48 loads rows of the dataset 10 via a first-in-first-out (FIFO) method. As such, the loader array 46 does not spend storage or loading cycles when the samples of the dataset 10 are empty. It should be noted that in the case that the dataset 10 has dense properties, the loader array 46 may still support loading of a dense dataset with the processing time scales up with the dataset density.

The systolic array 40 also includes a sink array 54 having a plurality of sinks 56 communicatively coupled to the PE array 42. Each of the plurality of sinks 56 aggregates partial results from each column of the PE array 42. In particular, each column of the PE array 42 includes a partial result corresponding to an offset or shift of the search region 32 in the direction 28, at a given offset or shift of the search region in the direction 30 (e.g., x-offset). Once the partial results are aggregated, the column of the PEs 44 streams the partial results to the corresponding sink 56 that adds the partial results. Subsequently, the sink 56 passes the result to an ejector 58 that sends the result to a suitable location (e.g., a system host).

Figure 3:
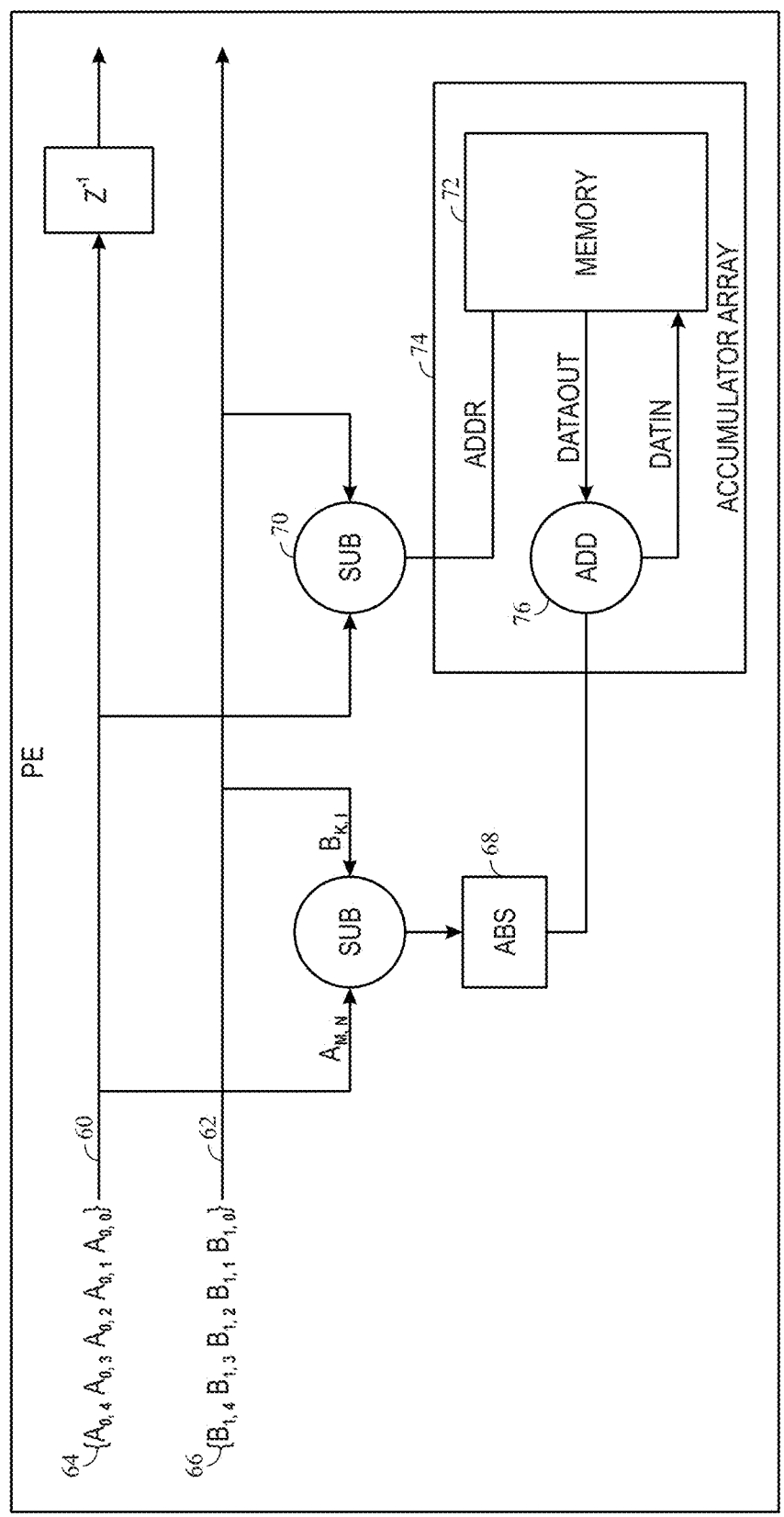
FIG. 3 is a block diagram illustrating computation performed by processing of elements of the systolic array of FIG. 2 to execute the SAD algorithm, in accordance with an embodiment.

The PEs 44 are the blocks that perform the computing operation on the data (e.g., data from the datasets 10 and 12). FIG. 3 is a diagram illustrating the computation performed by the PEs 44 to execute the SAD algorithm. Each of the PEs 44 receives two streams of data, a stream of data 60 from the dataset 10 and a stream of data 62 from the dataset 12. The streams of data 60 and 62 provide samples 64 and 66 in pairs and aligned according to the corresponding matric calculation. For example, the samples 64 include data "$A_{m,n}$" of the dataset 10 and the samples 66 include data "$B_{k,l}$" of the dataset 12. Each of the PEs 44 computes an absolute value (ABS) 68 of intrapair (e.g., $A_{m,n}$ and $B_{k,l}$) difference (e.g., ABS(SUB(A,B)), which is used to determine the correspondence between the intrapair and offset or shift of the sliding window (e.g., sliding window height 36 and a sliding window width 38). In particular, this is done by examining a difference 70 between row indices, m and k, of the dataset 10 and the dataset 12, respectively. The ABS value 68 (e.g., ABS(SUB(A,B)) may be stored in a memory 72 (e.g., the local memory of the PE 44) and added to an accumulated value designated for an y-offset value in the direction 28, as shown in an accumulator array 74. The accumulator array 74 may include a logical array of accumulators while each accumulates results for a given y-offset value in the direction 28. For each cycle (e.g., data loading cycle), only a single accumulator is executed. In certain embodiments, the accumulator array 74 may be efficiently built using a single accumulator 76 and an adjacent memory (e.g., memory 72) to store result for each y-offset in the direction 28.

As set forth above, data reuse is one of the key factors to enable efficient acceleration of the SAD algorithm across many PEs 44. In particular, the samples 64 and 66 of the datasets 10 and 12 are reused to create the 2D sliding window (e.g., the sliding window height 36 and the sliding window width 38). The reuse of data (e.g., the samples 64 and 66) in the x-direction (e.g., the direction 30) and the y-direction (e.g., the direction 28) are discussed separately in FIGS. 4 and 5 below.

Figure 4:
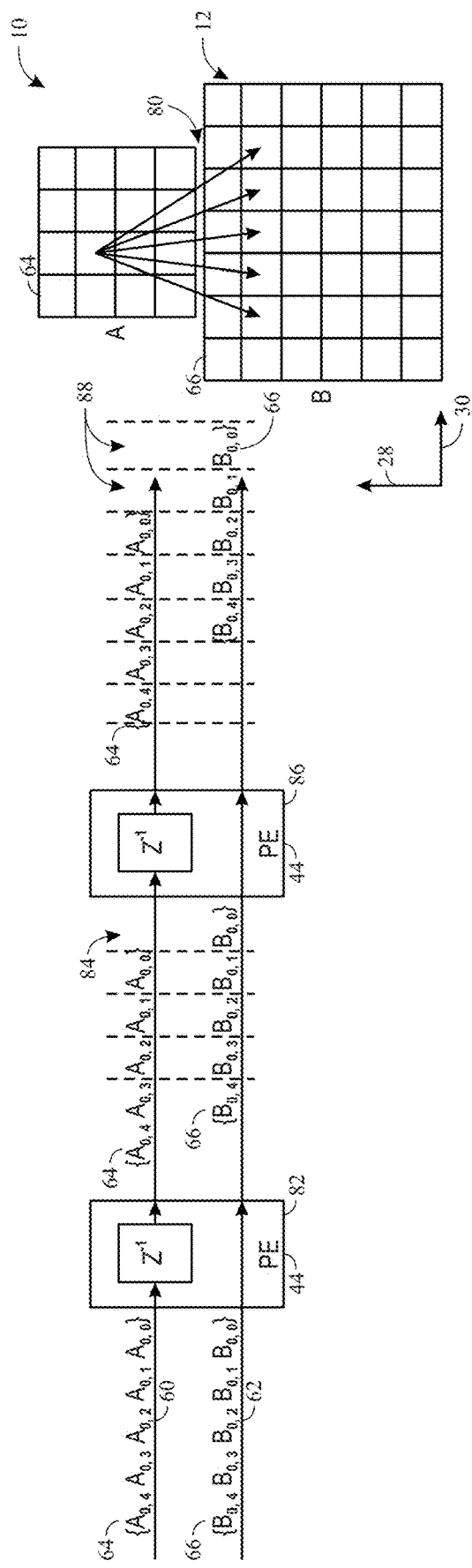
FIG. 4 is a schematic representation illustrating a data reuse scheme for the 2D datasets in x-dimension, in accordance with an embodiment.

FIG. 4 is a schematic representation illustrating the data reuse in the x-direction (e.g., the direction 30). Pairing between the samples 64 and 66 of the datasets 10 and 12 are indicated by arrows 80, along a row of the PEs 44. Each of the samples 64 from the dataset 10 is paired with multiple samples 66 along the row of the dataset 12. In particular, the data $A_{m,n}$ is used multiple times to pair with data $B_{k,l}$, $B_{k,l+1}$, $B_{k,l+2}$ ... $B_{k,l+window\_width}$. To enable data reuse in the x-direction (e.g., the direction 30), the transferring of the stream of data 60 is "delayed by one sample" (e.g., indicated as $Z^{-1}$) each time the sample 64 passes through the PEs 44. Such delay creates an effect alike a sliding window in the x-direction (e.g., the direction 30). For example, a first PE 44 has zero x-offset, a second PE 82 has one x-offset 84, a third PE 86 as two x-offsets 88, and so forth. As a result, the samples 64 of the dataset 12 may be reused for all of the offsets in the x-direction (e.g., the direction 30). As may be appreciated, such scheme enables parallel processing and acceleration in computation by factor of the sliding window width 38 (e.g., wind_width). It should be noted that to implement the data reuse scheme discussed above, the width 45 of the systolic array 40 is equal to the sliding width 38 (e.g., wind_width). Further, when there is a discontinuity in the data streams 60 and 62 due to the sparsity nature of the datasets 10 and 12, a padding may be used to create valid sample pairs (e.g., not to corrupt other irrelevant subsequent samples).

Figure 5:
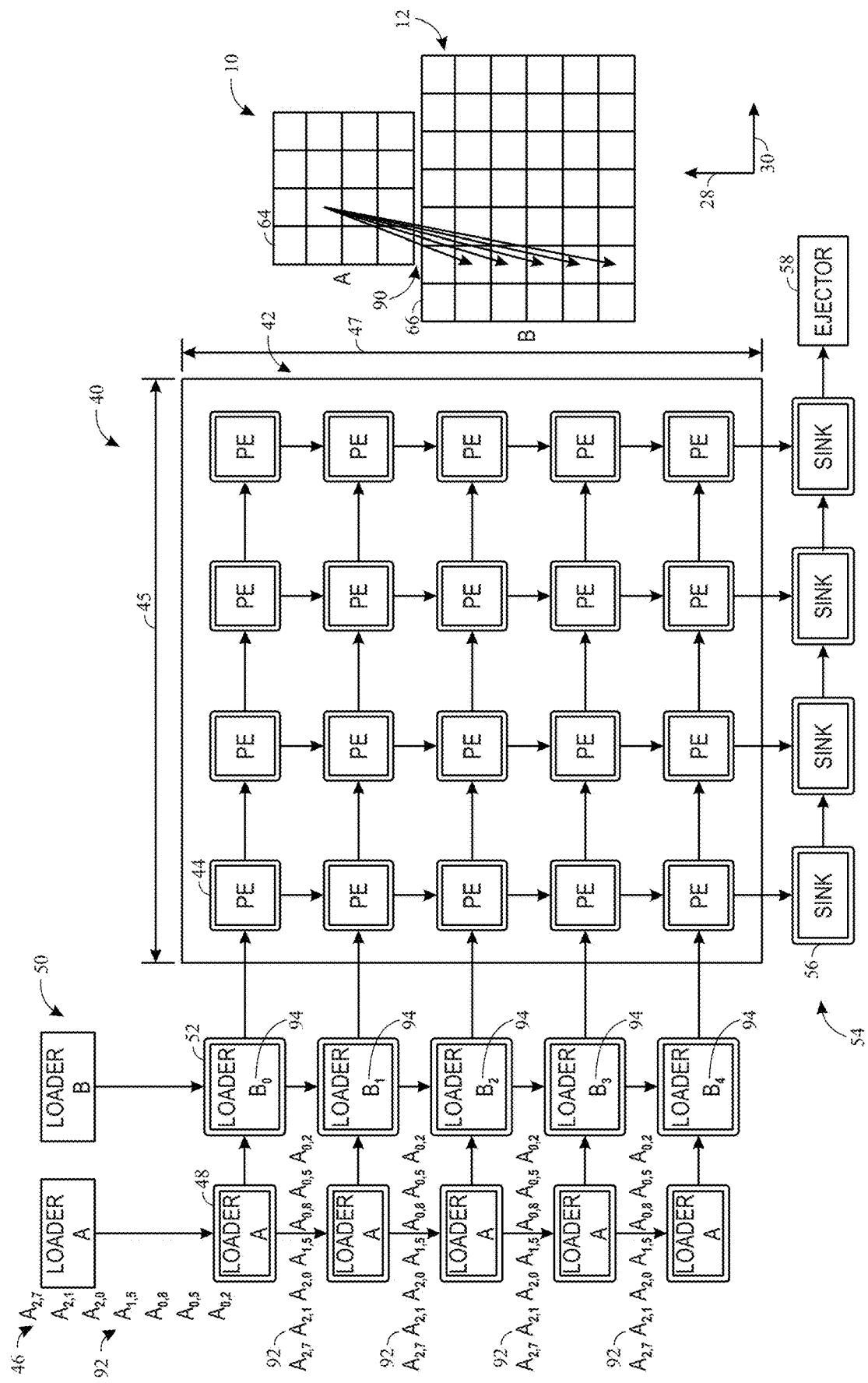
FIG. 5 is a schematic representation illustrating a data reuse scheme for the 2D datasets in y-dimension, in accordance with an embodiment.

FIG. 5 is a schematic representation illustrating the data reuse in the y-direction (e.g., the direction 28). Pairing between the samples 64 and 66 of the datasets 10 and 12 are indicated by arrows 90, along a column of the PEs 44. Each of the samples 64 from the dataset 10 is paired with multiple samples 66 along the column of the dataset 12. In particular, the data $A_{m,n}$ is used multiple times to pair with data $B_{k,l}$, $B_{k+1,l}$, $B_{k+2,l}$ ... $B_{k+window\_height,l}$. In order to reuse data more efficiently in the case that the dataset 10 is sparse, a full row of the samples 66 from the dataset 12 are used with to pair with all relevant samples 64 from the dataset 10 (e.g., $A_{m,n}$ that are not empty, not zero). In particular, each of the samples 64 (e.g., $A_{m,n}$) from the dataset 10 is processed in conjunction with the samples 66 (e.g., $B_{k,l}$) from the dataset 12, and this process continues for each paired $A_{m,n}$ and a row of $B_{k,l}$ until the row index (e.g., m) of $A_{m,n}$ is the same number as the row index (e.g., k) of $B_{k,l}$. Once the row index (e.g., m) of $A_{m,n}$ and the row index (e.g., k) of match one another, there is no need for row k of $B_{k,l}$ anymore (e.g., data from row k is already processed), and data from row k of the dataset 12 are dropped (e.g., deleted from the local memory), while the loaders 52 (e.g., loader B) load data from the next row of the dataset 12 (e.g., $B_{k+1}$) from the external memory to the local memory of the loaders 52. For example, in the illustrated embodiment, the relevant sample 92 (e.g., not empty, not zero) from the dataset 10 are $A_{2,7}$, $A_{2,1}$, $A_{2,0}$, $A_{1,5}$, $A_{0,8}$, $A_{0,5}$, and $A_{0,2}$ that are transferred from the external memory to the local memory of the loaders 48 (e.g., loader A). Correspondingly, samples 94 from rows $B_0$, $B_1$, $B_2$, $B_3$, and $B_4$ of the dataset 12 are transferred from the external memory to the local memory of the loaders 52 (e.g., loader B).

Figure 6:
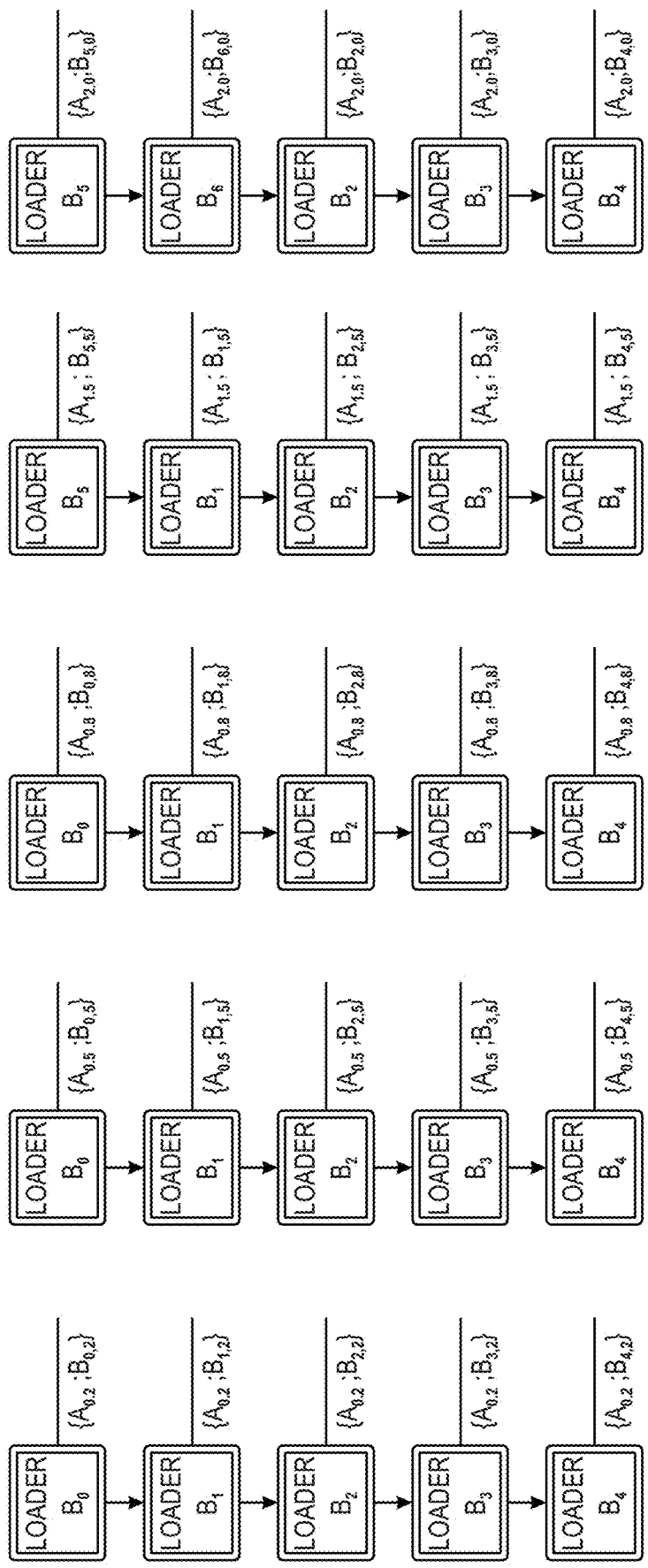
FIGS. 6A, 6B, 6C, 6D, and 6E are schematic representations illustrating example pairing between 2D datasets that enable the data reuse scheme of FIG. 5, in accordance with an embodiment.

Next, the progression of $A_{m,n}$ processed in conjunction with the different rows of $B_{k,l}$ (e.g., $B_0$, $B_1$, $B_2$, $B_3$, $B_4$, and so forth) is discussed in FIGS. 6A, 6B, and 6C below. As illustrated in FIG. 6A, relevant $A_{m,n}$ with the row index m=0 (e.g., $A_{0,2}$) is processed in conjunction with $B_{k,l}$ having the row indices k=0, 1, 2, 3, and 4 (e.g., $B_{0,2}$, $B_{1,2}$, $B_{2,2}$, $B_{3,2}$, and $B_{4,2}$) and a matching column index, n=l=2. Subsequently, as illustrated in FIG. 6B, another relevant $A_{m,n}$ with the row index m=0 (e.g., $A_{0,5}$) is processed in conjunction with $B_{k,l}$ having the row indices k=0, 1, 2, 3, and 4 (e.g., $B_{0,5}$, $B_{1,5}$, $B_{2,5}$, $B_{3,5}$, and $B_{4,5}$) and a matching column index, n=l=5. Subsequently, as illustrated in FIG. 6C, another relevant $A_{m,n}$ with the row index m=0 (e.g., $A_{0,8}$) is processed in conjunction with $B_{k,l}$ having the row indices k=0, 1, 2, 3, and 4 (e.g., $B_{0,8}$, $B_{1,8}$, $B_{2,8}$, $B_{3,8}$, and $B_{4,8}$) and a matching column index, n=l=8. After this, there is no other relevant $A_{m,n}$ with a row index m=0, thus pairings shown in FIGS. 6A, 6B, and 6C conclude all of the computing processes in which $B_{k,l}$ with the row index k=0 is needed. Accordingly, $B_{k,l}$ with the row index k=0 are dropped (e.g., deleted from the local memory of the loader 52).

Next, $B_{k,l}$ with the row index k=5 is transferred from the external memory to the local memory of the loader 52 (e.g., loader B). As illustrated in FIG. 6D, relevant $A_{m,n}$ with a row index m=1 (e.g., $A_{1,5}$) is processed in conjunction with $B_{k,l}$ having the row indices k=5, 1, 2, 3, and 4 (e.g., $B_{5,5}$, $B_{1,5}$, $B_{2,5}$, $B_{3,5}$, and $B_{4,5}$) and a matching column index, n=l=5. After this, there is no other relevant $A_{m,n}$ with a row index m=1, pairing showing in FIG. 6D concludes all of the computing processes in which $B_{k,l}$ with the row index k=5 is needed. Accordingly, $B_{k,l}$ with the row index k=5 is dropped (e.g., deleted from the local memory of the loader 52).

Next, $B_{k,l}$ with the row index k=6 is transferred from the external memory to the local memory of the loader 52 (e.g., loader B). As illustrated in FIG. 6E, relevant $A_{m,n}$ with a row index m=2 (e.g., $A_{2,0}$) is processed in conjunction with $B_{k,l}$ having the row indices k=5, 6, 2, 3, and 4 (e.g., $B_{5,0}$, $B_{6,0}$, $B_{2,0}$, $B_{3,0}$, and $B_{4,0}$) and a matching column index, n=l=6. After this, there is no other relevant $A_{m,n}$ with a row index m=2, pairing showing in FIG. 6E concludes all of the computing processes in which $B_{k,l}$ with the row index k=6 is needed. Accordingly, $B_{k,l}$ with the row index k=6 is dropped (e.g., deleted from the local memory of the loader 52).

The data deletion and new data loading processes discussed above proceed until the rest of the non-sparse $A_{m,n}$ (e.g., $A_{2,1}$ and $A_{2,7}$) are processed in conjunction with $B_{k,l}$, and a single pass through the PE array 42 completes. The combination of data reuse in the x-direction and the y-direction (e.g., the direction 30 and the direction 28) discussed above enables the systolic array 40 to calculate all required results for all sliding window offsets (e.g., x-offsets and y-offsets) in a single pass.

The data reuse scheme illustrated above may be able to reduce the required external memory bandwidth in factor of sliding window height 36×the sliding window width 38 (e.g., wind_height×wind_width). For example, if the SAD algorithm was expressed in the following pseudo-code, this data reuse technique may eliminate the nested loop along i and j in the pseudo-code.

```
For i = 1:wind_height
    For j = 1:wind_width
        For k = 1:height
            For m = 1:width
                Res(l,j) = rest (l,j) + abs(A(i,j,k,m) − B(i,j,k,m))
            end
        end
    end
end
```

Such reduction in bandwidth requirement of the external memory is especially significant in the case that the sliding window dimensions are significant. The data reuse scheme may also improve parallel computing acceleration. In the illustrated embodiment, the acceleration factor is a function of the size of the PE array 42 (e.g., width 45×height 47). For example, the acceleration factor scales with the size of the PE array 42.

Figure 7:
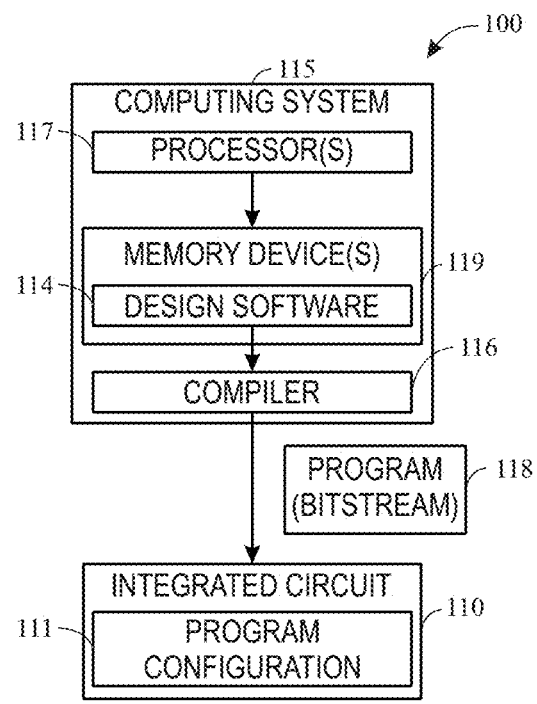
FIG. 7 is an integrated circuit system that may be used to carry out an implementation of a systolic array, in accordance with an embodiment.

With the foregoing in mind, FIG. 7 illustrates a block diagram of a system 100 that may be used to program a systolic array onto an integrated circuit 110. The integrated circuit 110 may be reconfigurable (e.g., a field programmable gate array (FPGA)) or may be an application-specific integrated circuit (ASIC). A user may implement a circuit design to be programmed onto the integrated circuit 110 using design software 114, such as a version of Quartus by Intel®.

The design software 114 may be executed by one or more processors 117 of a computing system 115. The computing system 115 may include any suitable device capable of executing the design software 114, such as a desktop computer, a laptop, a mobile electronic device, a server, or the like. The computing system 115 may access, configure, and/or communicate with the integrated circuit 110. The processor(s) 117 may include multiple microprocessors, one or more other integrated circuits (e.g., application specific integrated circuits, field programmable gate arrays, reduced instruction set processors, and the like), or some combination of these.

One or more memory devices 119 may store the design software 114. In addition, the memory device(s) 119 may store information related to the integrated circuit 110, such as control software, configuration software, look up tables, configuration data, etc. In some embodiments, the processor(s) 117 and/or the memory device(s) 119 may be external to the computing system 115. The memory device(s) 119 may include a tangible, non-transitory, machine-readable-medium, such as a volatile memory (e.g., a random access memory (RAM)) and/or a nonvolatile memory (e.g., a read-only memory (ROM)). The memory device(s) 119 may store a variety of information and be used for various purposes. For example, the memory device(s) 119 may store machine-readable and/or processor-executable instructions (e.g., firmware or software) for the processor(s) 117 to execute, such as instructions to determine a speed of the integrated circuit 110 or a region of the integrated circuit 110, determine a criticality of a path of a design programmed in the integrated circuit 110 or a region of the integrated circuit 110, programming the design in the integrated circuit 110 or a region of the integrated circuit 110, and the like. The memory device(s) 119 may include one or more storage devices (e.g., nonvolatile storage devices) that may include read-only memory (ROM), flash memory, a hard drive, or any other suitable optical, magnetic, or solid-state storage medium, or any combination thereof.

The design software 114 may use a compiler 116 to generate a low-level circuit-design program 118 (bitstream), sometimes known as a program object file, which programs the integrated circuit 110. That is, the compiler 116 may provide machine-readable instructions representative of the circuit design to the integrated circuit 110. For example, the integrated circuit 110 may receive one or more programs 118 (bitstreams) that describe the hardware implementations that should be stored in the integrated circuit 110. The programs 118 (bitstreams) may programmed into the integrated circuit 110 as a configuration program 111.

Figure 8:
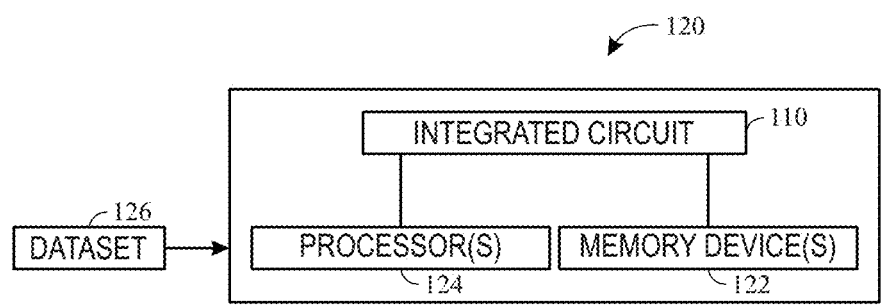
FIG. 8 is an example of an electronic system for processing datasets using the systolic array systems and methods of this disclosure, in accordance with an embodiment.

As shown in FIG. 8, the integrated circuit 110 may operate in a data processing system 100 to assist in processing a dataset 126 using the systolic array systems and methods of this disclosure. The data processing system 120 may represent, for example, a computing device in a datacenter, which may process network traffic, image data, video data, financial data, or any other suitable form of data. In some examples, the dataset 126 may be processed using a machine-learning or neural-network algorithm that may employ the systolic array of this disclosure. A processor complex 124 may execute instructions (e.g., software or firmware) stored in memory and/or storage 122 to receive and route the dataset 126 and to control the integrated circuit 110. For instance, the processor complex 124 may run software to analyze process network traffic, image data, video data, financial data, or any other suitable form of data, offloading to the integrated circuit 110 operations that are well-suited to processing by a systolic array on the integrated circuit 110. The memory and/or storage 122 may store the one or more programs 118 (bitstreams) that may be used to program a programmable fabric of the integrated circuit 110 (e.g., when the integrated circuit 110 is a programmable logic device, such as a field-programmable gate array (FPGA)).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A systolic array implemented in circuitry of an integrated circuit, comprising:
    a processing element array, comprising processing elements arranged in a vertical direction and a horizontal direction;
    first loaders communicatively coupled to the processing element array to load samples $A_{m,n}$ from at least one external memory to the processing element array; and
    second loaders communicatively coupled to the processing element array to load samples $B_{k,l}$ from the at least one external memory to the processing element array, wherein each row of the samples $A_{m,n}$ is loaded one row at a time to a single processing element along the horizontal direction, and each row of the samples $B_{k,l}$ is loaded one row at a time to a single processing element along the vertical direction, wherein pairing between the samples $A_{m,n}$ and $B_{k,l}$ in the horizontal direction and the vertical direction enables data reuse to reduce bandwidth usage of the external memory, wherein a first row of the samples $A_{m,n}$ are loaded n times to a first row of the processing element array with delayed data transfer across the first row of the processing element array.

2. The systolic array of claim 1, wherein the processing element array computes sum of absolute differences (SAD).

3. The systolic array of claim 1, wherein the first loaders load the samples $A_{m,n}$ via a first-in-first-out (FIFO) method.

4. The systolic array of claim 1, wherein the first loaders load non-zero samples $A_{m,n}$ while the second loaders load the $B_{k,l}$ samples having a row index equal to a corresponding row index of the non-zero sample $A_{m,n}$ and a column index equal to corresponding column index of the non-zero sample $A_{m,n}$.

5. The systolic array of claim 4, wherein once the row of the samples $B_{k,l}$ is processed by the single processing element, the row of the samples $B_{k,l}$ is deleted from the systolic array.

6. The systolic array of claim 4, wherein the samples $A_{m,n}$ comprise a sparse matrix and the samples $B_{k,l}$ comprise a dense matrix.

7. The systolic array of claim 4, wherein the samples $A_{m,n}$ with zero values are padded.

8. A systolic array implemented in circuitry of an integrated circuit, comprising:
    a plurality of processing elements, wherein each of the plurality of processing elements receives a first data stream comprising a row of a first dataset having samples $A_{m,n}$ and a second data stream comprising a row of a second dataset having samples $B_{k,l}$ over a plurality of computing cycles that output a plurality of values to construct a two-dimensional sliding window, wherein each of the plurality of processing elements comprises:
        a first circuitry to compute an absolute value of an intrapair between the first data stream and the second data stream;
        a second circuitry to compute a difference between row indices m and k of the samples $A_{m,n}$ and the samples $B_{k,l}$, wherein the difference provides an indication of a correspondence between the intrapair and the two-dimensional sliding window; and
        an accumulator array to accumulate computed results from the first circuitry based on the indication.

9. The systolic array of claim 8, wherein the two-dimensional sliding window comprises a two-dimensional array, wherein each element of the two-dimensional array comprises a sum of absolute difference (SAD) based on comparison between the first and second datasets.

10. The systolic array of claim 8, wherein the first data stream is received according to a first data transfer scheme and the second data stream is received according to a second data transfer scheme.

11. The systolic array of claim 10, wherein the first data transfer scheme comprises delaying data transfer by one sample between directly adjacent processing elements every time the first data stream is transferred to a different processing element cross a row of the plurality of processing elements.

12. The systolic array of claim 10, wherein the first dataset comprises a sparse matrix and the first data transfer scheme comprises transferring the first data stream via a first-in-first-out (FIFO) method.

13. The systolic array of claim 10, wherein the first dataset comprises a sparse matrix and the first data transfer scheme comprises transferring only non-zero samples $A_{m,n}$.

14. The systolic array of claim 13, wherein the second data transfer scheme comprises transferring a first row of the samples $B_{k,l}$, wherein the first row of the samples $B_{k,l}$ have a row index and a column index equal to a first corresponding row index and a first corresponding column index of the non-zero samples $A_{m,n}$.

15. The systolic array of claim 14, wherein the second data transfer scheme comprises:
    replacing the first row of the samples $B_{k,l}$ with a second row of the samples $B_{k,l}$, wherein the second row of the samples $B_{k,l}$ have a row index and a column index equal to a second corresponding row index and a second corresponding column index of the non-zero samples $A_{m,n}$.

16. A method to determine similarity between two datasets, comprising:
- loading samples $A_{m,n}$ of a first dataset via a first data loading scheme, one row at a time, to a processing element of a systolic array comprising an array of processing elements, one processing element at a time;
- loading samples $B_{k,l}$ of a second dataset via a second data loading scheme, in conjunction with loading the samples $A_{m,n}$ to the processing element, one row at a time and one processing element at a time, wherein the second data loading scheme comprises:
  - loading a first row of the samples $B_{k,l}$, wherein the first row of the samples $B_{k,l}$ have a row index and a column index equal to a first corresponding row index and a first corresponding column index of the samples $A_{m,n}$; and
  - replacing the first row of the samples $B_{k,l}$ with a second row of the samples $B_{k,l}$, wherein the second row of the samples $B_{k,l}$ have a row index and a column index equal to a second corresponding row index and a second corresponding column index of the samples $A_{m,n}$; and computing a sum of absolute difference (SAD) value at each processing element.

17. The method to determine similarity between two datasets of claim 16, wherein the first data loading scheme comprises delaying data transfer by one sample between directly adjacent processing elements every time the samples $A_{m,n}$ are loaded to a different processing element cross a row of the array of processing elements.

18. The method to determine similarity between two datasets of claim 16, wherein the first corresponding row index and the first corresponding column index of the samples $A_{m,n}$ comprises the first corresponding column index of non-zero samples of the samples $A_{m,n}$.

19. The method to determine similarity between two datasets of claim 18, wherein the second corresponding row index and the second corresponding column index of the samples $A_{m,n}$ comprise the second corresponding row index and the second corresponding column index of non-zero samples of the samples $A_{m,n}$.

20. The method to determine similarity between two datasets of claim 16, wherein the samples $A_{m,n}$ comprise only non-zero samples.

\* \* \* \* \*